Aug. 17, 1937.　　　G. LANGFORD　　　2,090,481
METHOD OF REFORMING WORN RAIL JOINT BARS
Filed Nov. 14, 1936　　3 Sheets-Sheet 1
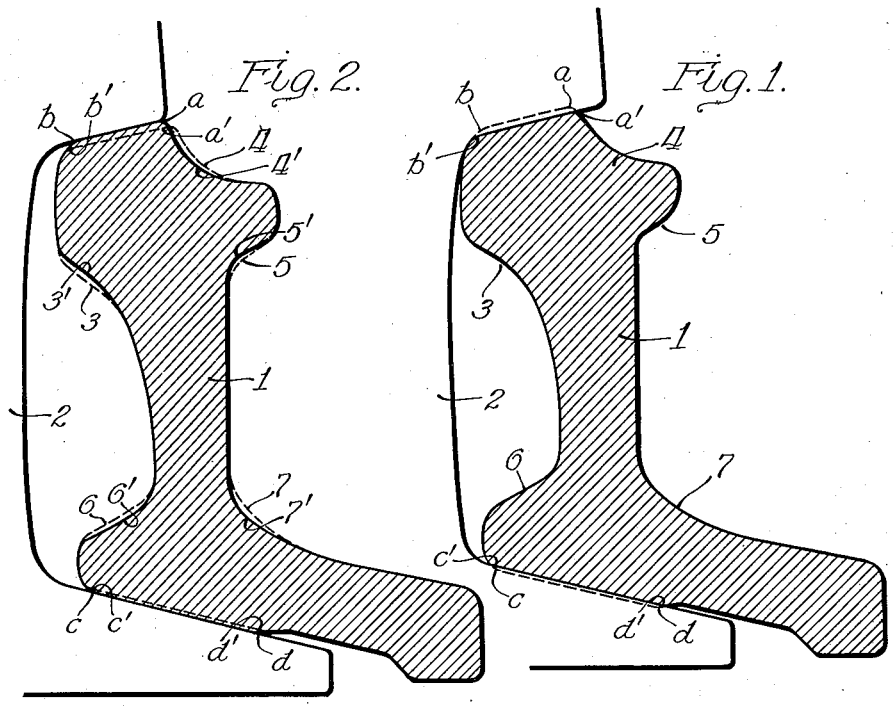
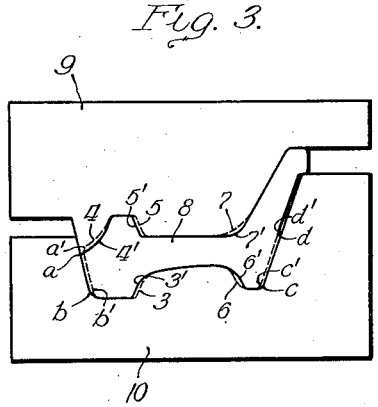
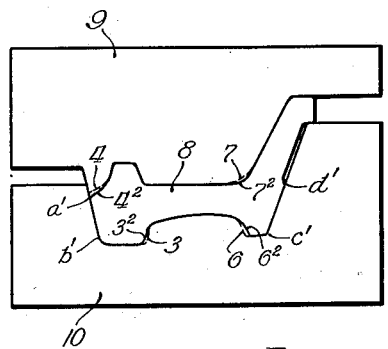
Inventor:
George Langford
By: Brown, Jackson, Boettcher & Dienner
Attys.

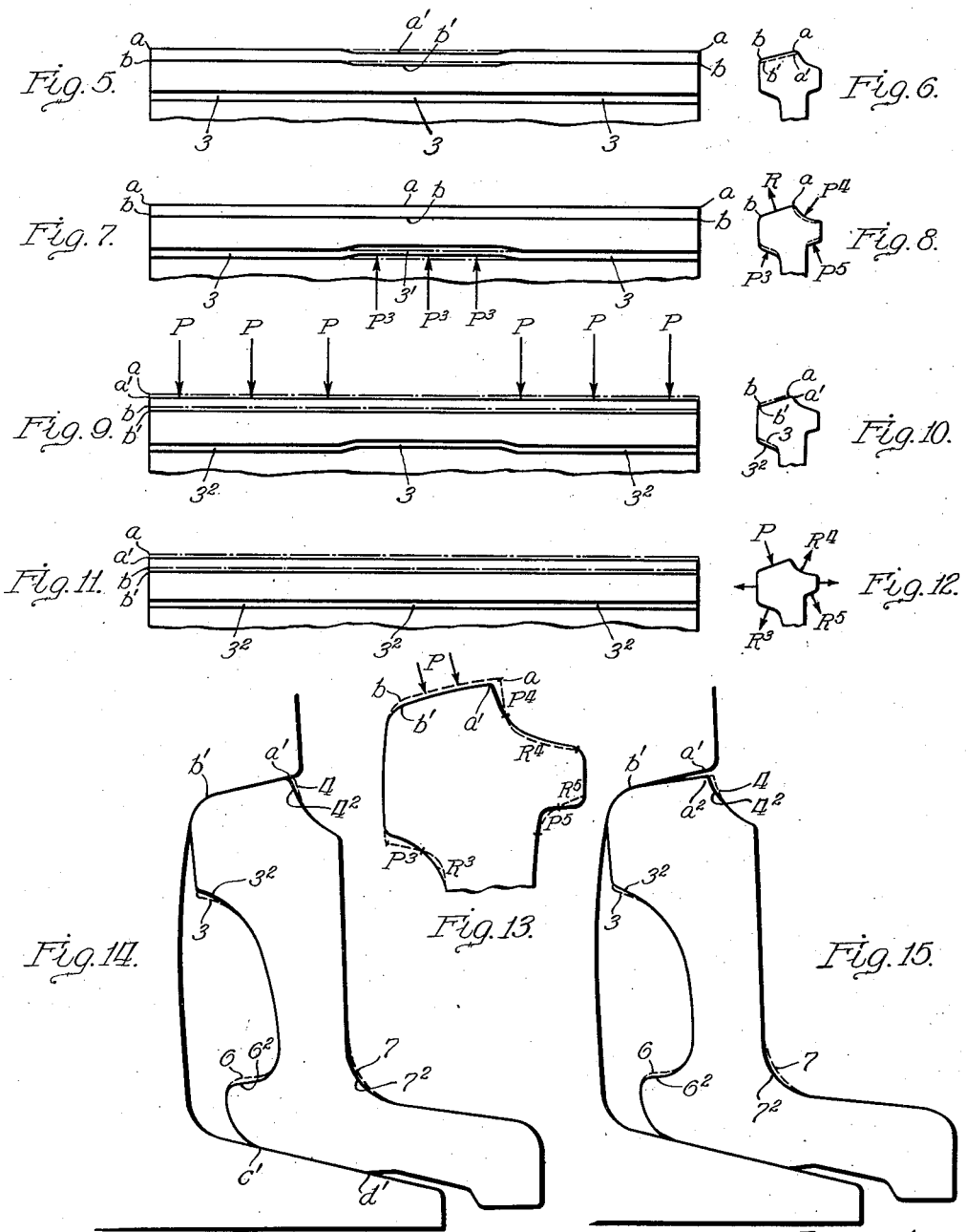

Aug. 17, 1937.   G. LANGFORD   2,090,481
METHOD OF REFORMING WORN RAIL JOINT BARS
Filed Nov. 14, 1936   3 Sheets-Sheet 3
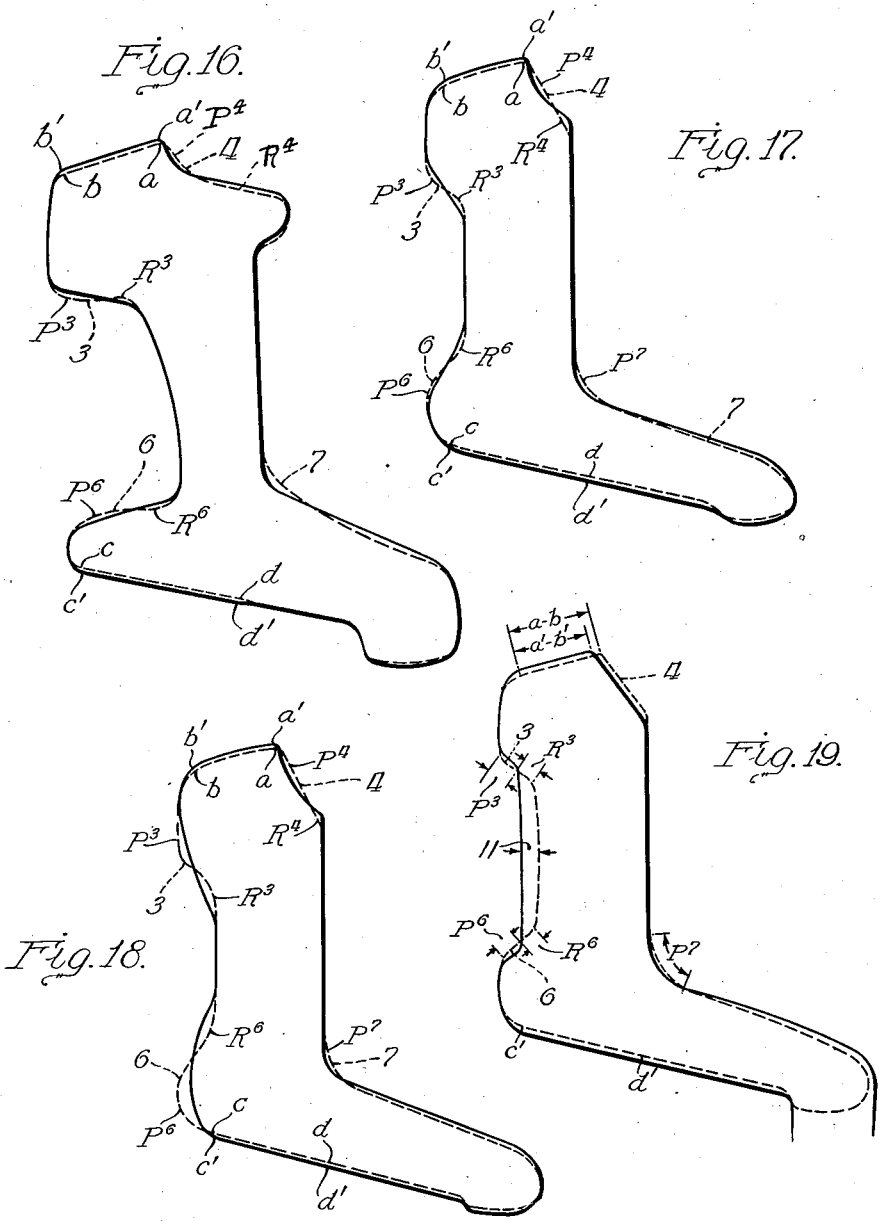
Inventor:
George Langford
By: Brown, Jackson, Boettcher ⁓Dienner.
Attys.

Patented Aug. 17, 1937

2,090,481

UNITED STATES PATENT OFFICE 2,090,481

METHOD OF REFORMING WORN RAIL JOINT BARS

George Langford, Joliet, Ill.

Application November 14, 1936, Serial No. 110,811

11 Claims. (Cl. 29—169)

The present invention has to do with a method of reforming or reshaping the splice bars used to couple rail ends together in a track.

Although bolted to the rail ends, the bars have some movement on the rail ends, and this results in wear of the contacting surfaces of the bars and rails. The contacting surfaces of bars and rails both, are called fishing surfaces, and it depends upon them to keep the joint tight so that the track will not yield at the joint under moving load and make rough riding. Very little looseness of the joint will do this, and so the maintenance of fishing surfaces and a tight joint fit are very important. However, the ordinary procedure of joint wear presents serious difficulties because of the fact that wear is ordinarily much greater at the central portion than at the end portions. The reforming of a worn rail joint bar encounters this difficulty. A worn bar requires more reforming at its center portion than at its end portions. This peculiarity has necessitated special methods of manufacture.

The present method, particularly adapted to the reforming of worn rail joint bars, may be applied in two ways, by direct or by indirect pressure. Either way permits of a single operation performed preferably in dies under a press. Direct pressure is used to reform bars of one height to bars of another and lower height. Indirect pressure is used to reform bars of one height to bars of another and greater height. When using direct pressure, the fishing surface wall of the die strikes the corresponding surface of the bar and pushes it into place. When using indirect pressure, the pressure first strikes some surface other than a fishing surface and pushes the bar's fishing surface to and against the corresponding die wall. In both cases of direct and indirect pressure, the method of my invention provides for concentration of pressure on the worn parts of a bar, and relief from pressure on the unworn parts, without the necessity for bulges in the die walls or other irregularities for counteracting loss of metal in the worn part of the bar. Briefly, my method is one whereby a bar is heated to a working temperature and then subjected to a reforming pressure to restore a centrally worn fishing surface, certain other surfaces of the bar near or opposite the fishing surface being subjected to pressure on a part width of a surface throughout the length of the bar, and the remaining part width of the surface being relieved from pressure. The main object of this is to insure pressure and movement of metal to the worn central portion of a fishing surface, and relief from pressure on the less worn end portions of the fishing surface where less pressure and less movement of metal to the fishing surface is desired. Other objects and advantages will appear from the following description and from the drawings, in which:

Fig. 1 is an end sectional view of a worn bar fitted to an unworn rail profile;

Fig. 2, a view corresponding to Fig. 1, is a bar reformed from the worn bar of Fig. 1;

Fig. 3 is an end view of a pair of dies closed upon a bar, illustrating a method of applying indirect reforming pressure;

Fig. 4, a view similar to Fig. 3, illustrates a method of applying direct reforming pressure;

Fig. 5 is an inside view of the top member of a worn bar, showing the ordinary central wear of the top fishing surface;

Fig. 6 is an end view of Fig. 5;

Figs. 7 and 8 represent the method of Fig. 3 used to make the bar of Fig. 2 by indirect pressure;

Figs. 9 and 10 represent the method of reforming by direct pressure;

Figs. 11 and 12 comparable with Figures 7 and 8 show the places of pressure and reaction when using direct pressure;

Fig. 13 illustrates the main feature of novelty in my invention;

Figs. 14 and 15 are types of bars produced by my invention;

Fig. 16 is an end view of a bar and an associated die cavity illustrating a modification of the method of my invention as applied to one type of bar;

Fig. 17 is a view similar to Figure 16 illustrating the method of the latter figure as applied to a second type of bar;

Fig. 18 is a view similar to Figure 16 illustrating the application of the method of my invention to a third type of bar; and Fig. 19 is a view similar to Figure 16 illustrating a fourth type of bar showing, with Figure 17, a method of reforming comparable to that of the latter figure.

From the following description it will be seen that my invention is in the nature of a refinement in mill practice to secure a better product, and to do it more cheaply.

Figure 1 is a sectional end view of a rail joint bar 1 fitted to a rail profile 2. The section of the bar is taken at its longitudinal center. The bar is worn out but the rail profile shows the rail unworn.

Ordinarily the wear of a joint is confined to the central, third or fourth of its length. The end portions do not wear much, and as a rule appreciable wear occurs there only when the joint is very badly worn. The only wear in a joint which need concern us at present, is confined to the top and bottom fishing or rail contacting surfaces.

In Fig. 1, the top fishing surface, originally $a$—$b$, has been worn down to $a'$—$b'$. This is at the central portion only. The top fishing surface, relatively unworn at the end portions, is shown by the dotted line $a$—$b$. The original unworn bottom fishing surface is denoted by the dotted line $c$—$d$. Its worn condition at the central portion of the bar is shown by the full line $c'$—$d'$. The top and bottom central wear can be taken up only by moving the bar in to the rails. Fig. 1 shows the central portion of the bar thus moved inward and at the end of its life because the top of the bar is against the rail web, and all of the top wear take-up space is used up. This figure is illustrative of the performance of bars of ordinary head contact type.

In the reforming of worn bars like that of Fig. 1, the general practice has been to restore the fishing height so that the bar may be used again on the same rail section, on which it was used originally as shown in Fig. 2. The centrally worn fishing height must be increased at top and bottom, and if the reformed bar is to be used again on the worn rails there must be a further increase of fishing height at its central portion.

As the greatest wear is at the top and bottom central portions of the bar, in a worn bar there is actually less metal in the top and bottom members at their central portion than at their end portions. This central loss of metal may not be great, and yet it is a most disturbing factor in reforming. If not recognized and provided for, the central portion of the top fishing surface at least, will not be sufficiently restored to satisfy inspection whose severity continually increases.

The reforming of worns bars of ordinary head contact type into bars of the same type, is illustrated in Fig. 3 which is an end view of a top die 9 closed upon a worn bar 8 in a bottom die 10. The worn bar is in dotted lines; and the reformed bar corresponding in general to the closed die cavity, is shown in full lines. The worn top fishing surface $a'$—$b'$ is restored to $a$—$b$; and the worn bottom fishing surface $c'$—$d'$ is restored to $c$—$d$. Certain surfaces 4', 5' and 7' of the top die, and 3', 6' of the bottom die are used to impinge upon surfaces 4, 5 and 7, and 3 and 6, respectively, of the bar. As can be seen from the positions of these die surfaces, in full lines, to the corresponding bar surfaces, in dotted lines, the closing of the dies upon the bar will result in pressures upon these surfaces, and movement of surfaces $a'$—$b'$ and $c'$—$d'$ of the bar to surfaces $a$—$b$ and $c$—$d$, respectively, of the die. When referring later to pressures upon various surfaces, the pressures upon surfaces 4, 5, 7, etc. of the bar will be denoted by $P^4$, $P^5$, $P^7$, etc.

In Fig. 3, the reforming pressure is indirect because pressure on $a$—$b$ can be attained only when pressure on other surfaces forces $a$—$b$ to $a'$—$b'$.

In Fig. 4, the total fishing height of the die cavity is less than in Fig. 3 and conforms more closely to the centrally worn fishing height of the bar. The object of this is to apply pressure directly upon surfaces $a'$—$b'$ and $c'$—$d'$, and not indirectly as in Fig. 3 by draughts upon surfaces 3, 4, etc.

The product of the indirect pressure method of Fig. 3 is represented by the bar of Fig. 2, in full lines. The direct pressure method of Fig. 4 produces in substance, the bar of Fig. 1, in full lines. With certain refinements, this latter may be defined as a hinged type of bar, anchored to the rail on its top inner fillet and providing for inward rotative, wear take-up movement at the bottom. This type of bar is now represented by the head free bar and by the full head contact bar of my Patent No. 1,759,458 issued May 20, 1930.

The reforming of a worn bar primarily comprises the reforming of its worn top and bottom fishing surfaces, particularly the top one. There may be desired alterations of cross-section for various purposes, but the main thing is the restoration of worn fishing surfaces, and to that, the present invention is directed.

The discussion thus far has dealt only with the central portion of a worn bar. The wear is mostly at this central portion; and the end portions are relatively unworn, as far as the fishing surfaces are concerned. This is particularly true of the top fishing surface, which as a rule presents the greatest reforming difficulties. Reforming dies are open at the ends, and the cavity is made by planing longitudinally. To reform worn bars, the die cavity must provide in some manner to conform to the worn central portion of the bar, otherwise the reforming pressure will be spent largely on the unworn end portions of the bar without reaching the central portion. This latter is equivalent to reforming the end portions of a bar which need relatively little reforming, and not properly reforming the central portion which needs the greater part of the reforming.

Fig. 5 is a fragmentary inside view of the top member of a worn bar, and Fig. 6 is an end view of same. $a$—$b$ is the relatively unworn top fishing surface at the end portions, and $a'$—$b'$ represents this surface worn at the central portion. The central wear represents actual loss of metal.

Fig. 7 is Fig. 5 reformed, Fig. 8 being an end view of Fig. 7. Reforming pressure represented by arrows $P^3$ is applied centrally to the inside undersurface 3 of the top member thereby moving it to 3' and pushing the worn fishing surface $a'$—$b'$ back to $a$—$b$. This central pressure results from a central convexity in the die wall corresponding to surface 3. It is a die construction disclosed in my Patent No. 1,808,467 issued June 2, 1931. The method embodying this construction is disclosed in my Patent No. 1,808,468 issued June 2, 1931. The die walls are not all planed in straight from end to end, one or more of them being convexed centrally so that the cross-sectional area of the die cavity is smaller at the center than at the ends.

In my Patent No. 2,060,328, I secure a centrally contracted die cavity without any centrally convexing of a die wall as previously described. All of the die walls may be planed in straight from end to end resulting in what are known as "straight dies"; or in any other manner, the die may be made without any contraction of cross-sectional area centrally. Central contraction is gained however by so relating the die strength to the reforming pressure that one or both dies will actually bend at the ends under the pressure, thereby expanding the die cavity at the ends, bending back to the original position when the reforming pressure is released. The effect of central contraction of a die cavity is thus gained in "straight dies". What I now claim as new differs from the two previously described methods.

It has been shown that the dies of Fig. 4 result in the direct application of reforming pressure upon a fishing surface. The application of direct pressure is shown in Fig. 9, Fig. 10 being an end view of same. The reforming pressure, shown by arrows P, is at the end portions to push their surfaces $a—b$ down to $a'—b'$. In Fig. 7, the reforming pressure is applied underneath on surface 3 to push $a'—b'$ up to $a—b$. In Fig. 9, pushing the top fishing surface $a—b$ at the unworn end portions down to the plane of $a'—b'$ at the central portion, results in a change of surface 3 at the end portions to surfaces $3^2$. Surface 3 of the bar would require a corresponding die wall projection. In Figures 11 and 12, surface $3^2$ of the bar may be made without a die projection as at 3 in Figure 9. The wall $3^2$ of the die may be planed in straight as in Figure 11 when using the method of my invention.

Because of a special construction in the dies, this surface of the dies may be made straight from end to end as in Fig. 11, and surfaces 4 and 5 may also be made straight, so that the bar may be reformed in what have been defined as "straight dies", the cross-sectional area of the closed die cavity being substantially uniform throughout the length of the dies.

In Fig. 12, the reforming pressure P is first applied directly upon the top fishing surface at the end portions and metal is displaced at the ends. There being an excess of metal at each end portion, there must be some outlet or relief before sufficient reforming pressure can reach the more worn central portion of the bar. The central portion of the bar must be draughted to true up any roughness on the centrally worn fishing surface. But the surrounding surfaces are only partially draughted, the remaining part of one or more of these surfaces being provided in the die wall with an outlet or relief so that surplus metal may escape. The partial draughting and partial relief surface may be longitudinally straight, but because of the difference in wear of the bar at its center and ends, the action upon the corresponding surface of the bar is different at the center portion than at the end portions.

In Fig. 13, the worn bar head is in dotted lines, and the die cavity is in full lines. Pressure P acts first directly on the fishing surface $a—b$ at its end portions, and when this is pushed down to $a'—b'$, there may not be enough pressure at the central portion of $a'—b'$ to properly finish that portion. Recourse is then had to one or more of the surrounding surfaces 3, 4 and 5 to secure indirect pressure in the manner of Fig. 3 but with an accompanying and important provision.

To secure indirect reforming pressure at the worn central portion of the bar head, pressure $P^3$ is applied on only a part of surface 3, and surfaces 4 and 5 may be treated in the same manner. I have found that, inasmuch as $a'—b'$ of the bar requires little flow of metal to make it conform to die-wall $a'—b'$ at its central portion, this partial draughting generally provides enough pressure, even though indirect, to make the top fishing surface conform closely to the die wall $a'—b'$ at its central portion, in spite of the adjoining relief from pressure. On surface 3, $P^3$ is the draught, and $R^3$ is the relief. Under pressure $P^3$, there may be some divergence of metal flow to $R^3$ but not enough to detract appreciably from the proper finish of $a'—b'$ at its central portion. This use of combined pressure and relief from pressure on certain surfaces is the substance of my invention.

Just as $P^3$ is intended to provide indirect reforming pressure on $a'—b'$ at its central portion, so is $R^3$ intended to provide relief from direct pressure on $a—b$ at its end portions. Die wall surface 3 may be planed straight from end to end but the resultant bar will generally show surface 3 better finished at its end portions than at its center portion because of excess metal flow to the relief surface $R^3$ of the die wall. This difference in finish between the center portion and end portions of surface 3 would be fatal if present on the fishing surface $a'—b'$. It is of no consequence on surface 3 because that surface has no particular use and requires no accurate finish.

It can be seen that the method of Fig. 13 cures the main ailment by creating another. The centrally worn portion of a fishing surface is given a new finish by impairing the finish of one or more surrounding surfaces. But the impairment occurs where it does no harm. Such a method permits of "straight dies" originally and ones which remain straight when the dies are closed upon the bar.

The method of the present invention is particularly suited for reforming a worn head contact bar into a full head contact bar as illustrated in Fig. 14. It may also be used advantageously to reform a worn head contact bar into one of head free type, particularly as in Fig. 15 where the clearance of the top surface of the bar from the under side of the rail head is slight. These bars are reformed mainly by direct pressure for which my method is best suited. However, my method is also applicable to reforming by indirect pressure.

Where possible, direct pressure upon the central portion as well as upon the end portions of a worn fishing surface, is desirable. In any case some one or more surfaces, other than a fishing surface, included in a member comprising the fishing surface, are draughted for a part of their width, and not draughted on the other part width. The draughted part width is primarily intended to move metal to the worn central part of a fishing surface, and the other part width undraughted is primarily intended for release of surplus metal at the end portions of the bar member. A die-wall designed to secure these two results may be planed in straight from end to end, or in the case of a centrally crowned bar it may be made parallel to the crowned fishing surface die-wall.

It is important to emphasize that the widths of reforming pressure and of relief from pressure must be substantial. In practice I find that ¼ inch width is a good average for each part width of pressure and relief, and I prefer more if the central wear is considerable. The centrally worn surface may be to finished height, but its worn, unfinished state requires draughting to cause metal to flow to that surface, otherwise it will not be sufficiently finished to the desired accuracy. Accuracy of finish has now become a most vital matter, so much so that the bar reforming art once popular and widely practiced, has lost much of its popularity and may be largely discontinued unless ways and means are found for it to meet the severe competition to which it is now subjected. Apparently railroads are willing to scrap worn bars and buy new ones as before, unless reformed bars are brought up to a higher standard. This standard calls for more accurate finish of fishing surfaces, not merely at the central portion but throughout the length of the bar; furthermore this must be accomplished at temperatures ordinarily considered much too low for forging. Low temperature insures a machined-like finish, due to the non-formation of oxide or mill scale; and it is also essential for successful heat-treatment, for the bar must not only be hard but also tough enough to withstand the severe cold bend test. The time has come when bar reforming has ceased to be a mere repair job and must compete with newly rolled bars. This is a severe requirement which calls for a distinct advance in worn bar reforming methods if the practice is to continue. The method herein is directed to advancement. The use of a surface width, part for pressure and part for pressure relief, is very effective when used in combination with direct application of reforming pressure upon a fishing surface; and this is true, although I believe to a less extent, when indirect reforming pressure is employed.

The raising of a centrally worn surface to increased height, as well as restoring it, is a more difficult problem than lowering it; and yet it is the ordinary problem, because, as a rule, worn bars must be restored to at least their original unworn fishing height. This means that the first application of pressure must be on one or more surfaces of the bar, other than a fishing surface.

To secure accuracy, central wear must be recognized and provided for. The bar has lost top and bottom central metal; not much, but enough to cause much trouble in reforming.
By the use of central pressures and end reliefs distributed over certain surfaces, the loss of central metal may be counteracted and practically obliterated even though actually present. Under pressure in dies, metal will not flow from the ends to the more worn center unless, as in the method of my Patent No. 2,060,328, an inwardly moving pressure be secured to some extent by a bending of the dies lengthwise under pressure, and a return to straightness when the pressure is released. In such a case and also in the present instance the deficiency, although slight, of centrally worn metal may be made almost unrecognizable by diffusion.

In explaining my method of reforming a fishing surface to increased fishing height, I first select an extreme case as in Figure 16, wherein a fishing bearing member is greatly extended inwardly, the top member being the most important one so extended, so that surface 3 is sufficiently wide to secure pressure $P^3$ and relief $R^3$ widths sufficient to make metal flow to $a'—b'$ at center, and to make metal flow to $R^3$ at the ends. $R^3$ is a place of relief from pressure $P^3$, and is the only place of substantial relief when the top surface of the bar more than fills the top of the die at $a'—b'$, which ordinarily occurs at the end portions of the top member.

Even at the worn central portion, pressure $P^3$ moves some metal to $R^3$, and this inefficiency is unavoidable, but by employing a second surface 4 with ample pressure and relief widths, $P^4$ and $R^4$, respectively, surface $a—b$ may be successfully raised to $a'—b'$ without the necessity for a longitudinal convexity in a die wall or any other provision for contracting the central die cavity.

The die grooves may therefore be planed in straight from end to end.

The reforming of a worn bar is largely a reforming of the top member. The central wear is generally greater at the top than at the bottom, and the surfaces available for pressure and relief application are less extensive at the top, particularly in the angle form of bar. More particularly the method of my invention is primarily directed to surfaces on the inwardly extended part of a top or bottom member, and particularly the top one. The outer faces of the bar are of secondary importance. In Fig. 16 surface 4 may have pressure and relief widths $P^4$ and $R^4$, respectively, but these are merely accessories to the pressure and relief widths $P^3$ and $R^3$ on surface 3. The latter is therefore the all-important surface to be used in the reformation of the top member. Surface 4 is secondary, and may or may not be treated as shown, as required in any particular case. On the bottom member, surface 6 is generally the more important one for pressure and relief treatment, although not as much so as the top surface 3. Pressure and relief treatment of at least one of surfaces 3 and 6 is essential in the method of my invention. It is also essential that the width of a surface so treated be ample and substantial.

In Fig. 19, the inwardly extended part of the top member is so short that surface 3 is at or very close to a low limit of widths—almost too low for successful pressure and relief treatment. The worn bar is shown in dotted lines, and the enclosing die cavity profile in full lines. Relief $R^3$ is made by providing clearance 11 between the inner face of the bar web and the corresponding face of the die. In this case, the pressure and relief surfaces $P^3$ and $R^3$ are gained by a considerable spacing away at 11 of the inner web face of the bar and its corresponding die-wall. It is not enough to merely relieve the web of reforming. An amount of ten one-thousandths of an inch would relieve the web of reforming pressure, but this would result in practically no width of relief surface $R^3$. This relief width $R^3$ must be substantially as shown, but at best my method in this instance might not be entirely successful if considerable movement of metal is desired.

To reform more successfully the bar of Fig. 19 in longitudinally straight dies, I apply the method of my invention as shown in Fig. 17. Surface 3, of insufficient width in Fig. 19 is made so in Fig. 17 by angular inclination of the die wall corresponding to surface 3 of the bar so as to widen materially that surface enough for sufficient pressure and relief width $P^3$ and $R^3$, respectively. If necessary, pressure and relief treatment may be applied to surface 4 as shown. In Fig. 18, surface 3 of the die is made still wider by giving it still more angularity. This method of securing sufficient pressure and relief widths requires no further explanation. The inner profile of the bar is considerably altered but its essential qualifications are maintained.
The top fishing width need not be reduced as in Fig. 19. In Figures 3 and 4, the bars are shown positioned so that their outward web face is perpendicular to the direction of reforming pressure. This is not essential to my method. The dies may be inverted from the position shown, or the die cavity may be positioned angularly to the direction of pressure. The method of my invention is applicable to any die or bar positioning relative to the line of pressure. Although joint bars are generally worn more at the center than elsewhere, there may in the future be cases where wear or loss of metal may occur at parts of the bar other than the central portion. In such cases my method would be the same as has been previously described. I may also combine the present method with other methods if desired, such as those of my Patents Nos. 1,808,468; 2,060,328; and possibly others.

Briefly, my method is one designed for central pressure and end relief from pressure combined on one or more selected surfaces of a bar to restore a fishing surface, and as has been explained, the widths of pressure and relief must each be substantial. The method necessitates its application primarily to the lower inner surface of the top member, or of the upper, inner surface of the bottom member, or of both. It may also be applied to outer surfaces of the top member.

I claim:

1. The method of reforming the centrally worn fishing surface and included member of a rail joint bar, which comprises heating the bar to a working temperature and subjecting it to reforming pressure, said pressure being first applied upon the end portions of said fishing surface at said end portions, and then being applied on at least one of the other surfaces of said member for only a part of the width of said other surface and uniformly throughout its length so as to cause metal to flow and make new said worn fishing at its central portion to at least the reformed height of said fishing surface at its end portions, the other part of said width of said other surface being relieved of reforming pressure throughout its length.

2. The method of reforming the top fishing surface and included member of a worn rail joint bar, which comprises heating the bar to a working temperature and subjecting it to reforming pressure, said pressure being first applied on the end portions of said fishing surface so as to effect a maximum displacement of metal and reduced fishing height at said end portions, and then being applied on at least one of the other surfaces of said top member uniformly throughout the length of said other surface and for only a part of its width, the other part of said width being relieved of reforming pressure throughout its length.

3. The method of reforming a worn fishing surface and included member of a rail joint bar, which comprises heating the bar to a working temperature and subjecting it to reforming pressure, said pressure being first applied upon the end portions of said fishing surface so as to reform said fishing surface at said end portions to reduced fishing height, and then being applied on one of the other surfaces of said member throughout its length and for only a part of its width, the other part of said width of said other surface being relieved of reforming pressure throughout its length, said part width under pressure causing metal to flow to restore the worn central portion of said fishing surface, and said other part width providing for relief from reforming pressure at the end portions of said fishing surface.

4. The method of reforming a fishing surface and included member of a worn rail joint bar, which comprises heating the bar to a working temperature and subjecting it to reforming pressure, said pressure being first applied on the end portions of said fishing surface so as to effect a reduced fishing height and maximum displacement of metal at said end portions, and then being applied on one or more of the other surfaces of said member and on only a part of the width of said other surface throughout its length, the other part of said width of said other surface being relieved from reforming pressure throughout its length.

5. The method of reforming a fishing surface and included member of a worn rail joint bar, which comprises heating the bar to a working temperature and subjecting it to reforming pressure between opposed dies having receiving cavities made straight lengthwise of the dies and of a fishing height approximating the centrally worn fishing height of the worn bar, said pressure being first applied upon said fishing surface at its end portions so as to effect a maximum displacement of metal and reduced fishing height at said end portions, and then being applied on one or more of the other surfaces of said member, said pressure on said other surface being applied on only a part of the width of said other surface throughout its length, and the other part of said width of said other surface being relieved from reforming pressure throughout its length.

6. The method of reforming a worn fishing surface and included member of a worn rail joint bar, which comprises heating the bar to a working temperature and subjecting it to reforming pressure, said pressure being first applied on the end portions of said fishing surface so as to reduce the fishing height at said end portions, and then being applied on at least one of the other surfaces of said member for only a part of the width of said other surface and at its center portion at least, the other part of said width of said other surface being relieved from reforming pressure at least at its end portions.

7. The method of reforming a top or bottom member and included worn fishing surface of a worn rail joint bar, which comprises heating the bar to a working temperature, and subjecting said member to reforming pressure applied to at least the inwardly extended surface opposite said fishing surface and for a substantial part of the width of said opposite surface, the other part width of said opposite surface being substantial and being relieved from reforming pressure, said pressure width providing for flow of metal to the central portion of said fishing surface, and said relief width providing for flow of excess metal from the end portions of said fishing surface.

8. The method of reforming the top member and included worn fishing surface of a worn rail joint bar, which comprises heating the bar to a working temperature, and subjecting said top member to reforming pressure applied to at least the under surface of said member for a substantial part of its width, the other part of said width being substantial and being relieved from reforming pressure.

9. The method of reforming a top or bottom member and included worn fishing surface of a worn rail joint bar, consisting in heating the bar to a working temperature and subjecting said member to reforming pressure applied to at least the inner surface of said member opposite said fishing surface for a substantial part of the width of said opposite surface, the other part of said width being relieved from reforming pressure, said reforming pressure being angularly inclined to said opposite surface so as to provide increased widths of pressure and relief at said opposite surface.

10. The method of restoring the worn head fishing surface of a worn rail joint bar the head of which is provided with an inwardly projecting element and an outer surface extending from the outer edge of said fishing surface, which comprises heating said head to a working temperature and subjecting said head to reforming pressure by upper and lower die walls respectively acting upon said outer surface and the lower face of said element, with the lower die wall exerting reforming pressure upon an inner portion of the width of said lower face and providing clearance between the remainder of said width and said lower die wall effective for accommodating excess metal displaced by the reforming pressure exerted by said lower wall, and said upper die wall exerting reforming pressure upon a portion of the width of said outer surface adjacent said fishing surface and providing clearance between the remainder of the width of said outer surface and said upper die wall effective for accommodating excess metal displaced by the reforming pressure exerted by said upper wall.

11. The method of restoring the worn head fishing surface of a worn rail joint bar the head of which is provided with an inwardly projecting element, which comprises heating said head to a working temperature, and subjecting said head to reforming pressure applied to the lower face of said element by a flat die wall substantially equal in width to, and disposed at a greater inclination to the horizontal than said face, whereby said die wall exerts reforming pressure upon the inner portion of the width of said face while providing clearance at the remainder of said width effective for accommodating excess metal displaced by said reforming pressure.

GEORGE LANGFORD.